Feb. 10, 1925.

G. H. WOOLEVER 1,525,600

WATER MOTOR

Filed May 17, 1924

G. H. Woolever, Inventor

Patented Feb. 10, 1925.

1,525,600

UNITED STATES PATENT OFFICE.

GEORGE H. WOOLEVER, OF ELMWOOD, ILLINOIS.

WATER MOTOR.

Application filed May 17, 1924. Serial No. 714,058.

*To all whom it may concern:*

Be it known that I, GEORGE H. WOOLEVER, a citizen of the United States, residing at Elmwood, in the county of Peoria and State of Illinois, have invented a new and useful Water Motor, of which the following is a specification.

This invention relates to a water motor designed for use in small streams as well as rivers whereby the current of the body of water can be utilized for generating power.

Another object is to provide a motor of this character which is simple, durable and compact in construction, can be installed readily, and is highly efficient.

A still further object is to provide a motor utilizing an endless series of impact receiving elements so mounted that the force of the current can be applied to the motor at more than one point simultaneously.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1:
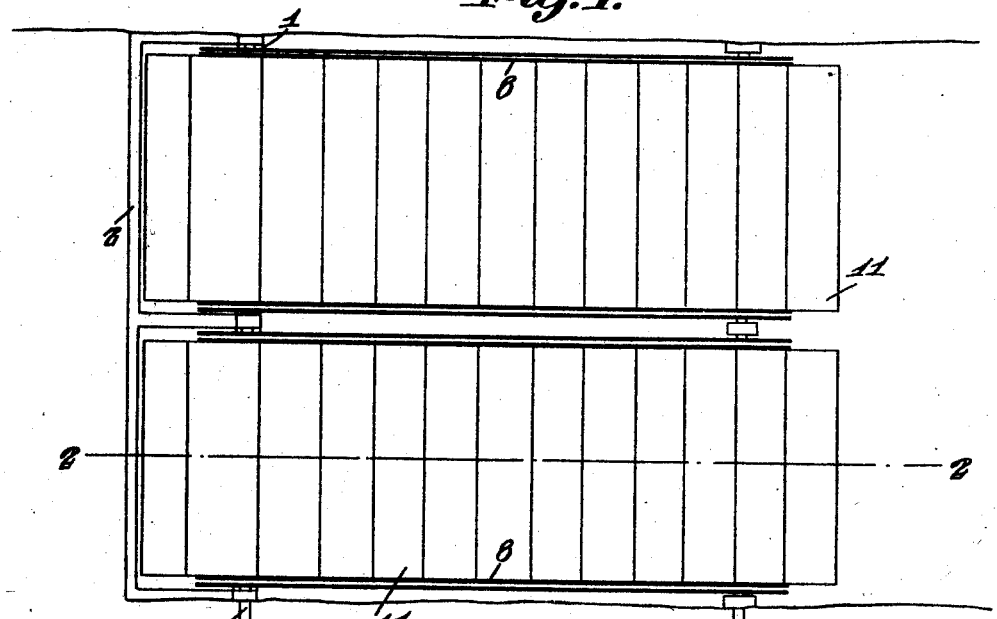
Fig. 1 is a plan view of the motor set up for use within a stream.

Referring to the figures by characters of reference 1 designates a dam adapted to be erected across the current, the bottom of the dam being spaced from the bed of the stream so that a portion of the body of water can flow freely under the dam. The upper portion of the dam can be located either below or above the surface of the body of water. A downwardly extending conduit 2 is arranged on the up-stream side of the dam with its upper open end below the surface of the water while its lower end is flush with or above the lower or bottom surface of the dam. This conduit can be of any desired cross sectional contour and any desired number of conduits can be located along the up-stream side of the dam. In Fig. 1 two conduits have been shown.

Arranged upon the bed of the stream or at any point adjacent thereto is a longitudinally extended conduit 3 pointed downstream and open at its ends. The up-stream end of this conduit 3 is spaced from the dam 1 and located below the bottom of the dam. A wall 4 is extended upwardly from the upstream end of conduit 3 and is spaced from the down-stream side of dam 1 so as to provide a vent 5. This wall preferably terminates below the level of the water. It is to be understood that any desired number of conduits 3 can be used, one of these conduits being provided for each conduit 2.

A transverse shaft 6 is extended parallel with and above the dam 1 and carries sprockets 7 or other suitable wheels on which are mounted endless chains 8 or the like. These chains are extended longitudinally through the conduit 2 and under sprockets 9 or other suitable wheels journaled under the dam 1. The chains are then extended forwardly through the conduit 3 into engagement with sprockets 10 or other suitable wheels journaled adjacent the down-stream end of conduit 3. From this point each chain is inclined upwardly and backwardly to the sprockets or wheels 7.

Interposed between and pivotally connected to the chains are impact receiving heads or blades 11. In the construction illustrated these heads are mounted off center so that the weight of that portion of each blade projecting in one direction from the chains will serve to hold stops 12 pressed against the chains and thus maintain the heads at right angles to the chains while passing through the conduits 2 and 3. It is to be understood of course that other arrangements of the blades or heads can be provided without departing from the present invention.

Figure 2:
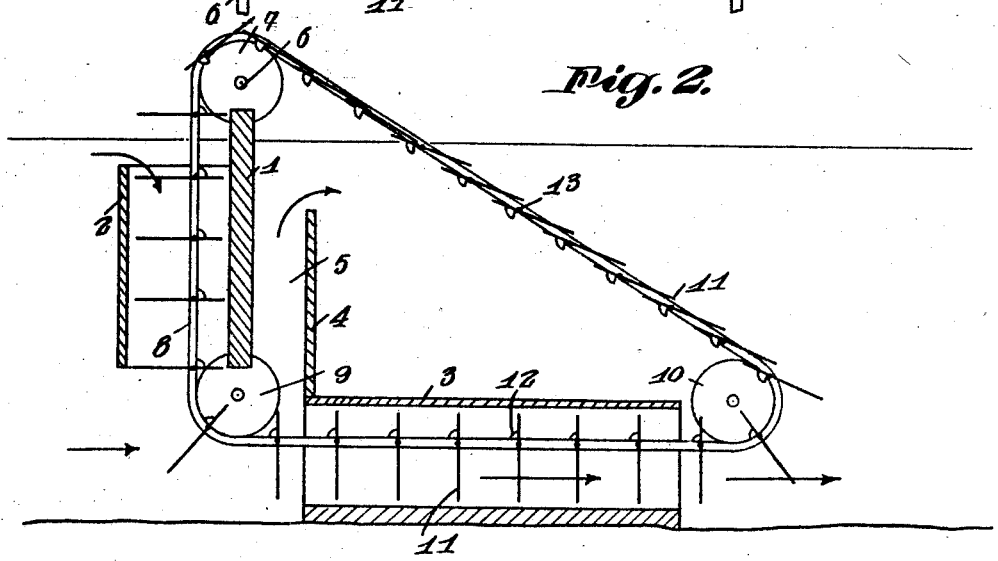
Fig. 2 is a section on line 2—2, Fig. 1.

When the motor is set up for use the water adjacent the surface of the current, on reaching the dam 1 will be deflected downwardly into conduit 2, thereby imparting an impulse to the head 11 in the upper portion of the conduit and operating to drive the heads and chains in the directions indicated by the arrows in Fig. 2. At the same time that portion of the water adjacent the bed of the stream will flow against the heads as they are successively exposed adjacent the bottom of the dam 1 so that a further impulse will be imparted to the motor. The space 5 acts as a spill-way through which surplus water will escape downstream if the conduits 3 cannot take care of the same. As the heads emerge from conduits 3 they will swing about their pivots 13 and feather through the water as they are drawn upwardly by the chains to the sprockets or wheels 7. On reaching a position above and past the shaft 6 the blades will successively flap over to their initial positions as shown and thus be ready again to receive the impact or pressure from the down-flowing current entering the conduits 2.

It will be apparent that by utilizing a motor such as described any water current can be employed for generating power and one or more units of the motor can be set up according to the size of the stream in which it is to be used.

Figure 3:
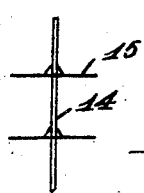
Fig. 3 is a view of a portion of a slightly modified structure.

If a stream is so dammed that there will be no overflow and the water at the two sides of the dam is at two widely separated levels, it is not necessary to have blades or heads that will feather. Instead the blades, as shown in Fig. 3 can be fixedly secured to the chain 14, these blades, 15, moving upwardly out of the water at the lower downstream level and thence over the top shaft and downwardly into the water at the upper or up-stream level.

What is claimed is:—

1. A water motor including a dam spaced at the bottom from the bed of a stream, a downwardly extending conduit upon the upstream side of the dam, another conduit extending down-stream below the level of the bottom of the dam, an endless series of heads movable successively through the conduits, each head being exposed to the force of the current at the inlet end of each conduit.

2. A water motor including a dam spaced at the bottom from the bed of a stream, a downwardly extending conduit upon the upstream side of the dam, another conduit extending down-stream below the level of the bottom of the dam, an endless series of heads movable successively through the conduits, each head being exposed to the force of the current at the inlet end of each conduit, and a spill-way between the dam and the down-stream conduit.

3. A water motor including a dam, a down-stream conduit below the bottom of the dam, said dam being spaced from the bed of the stream, an endless series of flexibly connected heads movable successively into the conduit to receive the pressure exerted by a current flowing under the dam, and a spill-way interposed between the dam and conduit.

4. A water motor including a dam, a down-stream conduit below the bottom of the dam, said dam being spaced from the bed of a stream, a downwardly extending conduit upon the up-stream side of the dam, an endless series of heads movable successively through the conduits, each head being exposed to the force of the current of a stream at the inlet end of each conduit, and means upon each head for holding the head in pressure receiving position while passing through each conduit but permitting the head to feather while moving against the current of the stream.

In testimony that I claim the foregoing as my own, I have hereto affixed my signature in the presence of two witnesses.

GEORGE H. WOOLEVER.

Witnesses:
 HERBERT D. LAWSON,
 I. C. STROBEL.